US008694631B2

(12) United States Patent  
Lohmar et al.

(10) Patent No.: US 8,694,631 B2  
(45) Date of Patent: Apr. 8, 2014

(54) HTTP STREAMING WITH PROVED SERVICE QUALITY

(75) Inventors: Thorsten Lohmar, Aachen (DE); Markus Kampmann, Aachen (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/388,618

(22) PCT Filed: Aug. 6, 2009

(86) PCT No.: PCT/EP2009/060201  
§ 371 (c)(1),  
(2), (4) Date: Apr. 13, 2012

(87) PCT Pub. No.: WO2011/015243  
PCT Pub. Date: Feb. 10, 2011

(65) Prior Publication Data  
US 2012/0191851 A1 Jul. 26, 2012

(51) Int. Cl.  
*G06F 15/173* (2006.01)

(52) U.S. Cl.  
USPC .......................................... 709/224

(58) Field of Classification Search  
CPC ..... H04L 65/80; H04L 65/4084; H04L 67/22; H04L 67/02; H04N 21/8451; H04N 29/06  
USPC ........................................ 709/224  
See application file for complete search history.

(56) References Cited

U.S. PATENT DOCUMENTS

| 2002/0023164 A1* | 2/2002 | Lahr ............................ 709/231 |
| 2008/0195745 A1* | 8/2008 | Bowra et al. ................. 709/231 |
| 2010/0067400 A1* | 3/2010 | Dolganow et al. ........... 370/253 |
| 2011/0026412 A1* | 2/2011 | Kahn et al. ................... 370/252 |

FOREIGN PATENT DOCUMENTS

WO 2006004472 A1 1/2006

OTHER PUBLICATIONS

Ozcelebi et al. "Enhancing End-to-End QoS for Multimedia Streaming in IMS—Based Networks", IEEE, Second International Conference on Systems and Networks Communications (ICSNC 2007), 2007, pp. 1-6.*  
Pantos. "HTTP Live Streaming", http://tools.ietf.org/html/draft-pantos-http-live-streaming-01, Jun. 8, 2009, pp. 1-17.*

* cited by examiner

Primary Examiner — John Macilwinen  
(74) Attorney, Agent, or Firm — Coats and Bennett PLLC

(57) ABSTRACT

This invention relates to a method for streaming a media file to an end user using a hypertext transfer protocol HTTP, wherein a proxy monitors HTTP messages for detecting a streaming of the media file using HTTP. When a HTTP message is received, the proxy determines bearer parameters required for streaming the media file and determines whether a bearer meeting an appropriate service quality is necessary. If necessary, the proxy triggers a provision of the bearer meeting with said appropriate service quality.

14 Claims, 4 Drawing Sheets

HTTP STREAMING WITH PROVED SERVICE QUALITY

TECHNICAL FIELD

The present invention relates to a method for streaming a media file with proved service quality to an end-user using a hypertext transfer protocol HTTP. The invention relates furthermore to an intermediate network node streaming the media file to the end-user and to the HTTP server on which the media file is provided.

BACKGROUND

Until recently, streaming of media files was realized using the real time streaming protocol RTSP as control protocol. The transmission of the streaming data itself is not the task of the RTSP protocol, the real time transport protocol RTP being used for media transport and the session description protocol SDP being used for session description. HTTP streaming is used for transmission of media data using a conventional web server. Media files can also be transferred without a RTSP server using progressive download. Progressive download describes a technique where the media file is progressively downloaded to the end-user and, as soon as enough data are present on the receiving side, the playout is started. HTTP streaming and progressive download using HTTP is becoming more important. By way of example, some cellular phones only support progressive data download using .mp4 or .3gp file formats.

Content download including HTTP streaming and progressive download is not defined for the IP multimedia subsystem IMS, IMS providing an architecture offering voice over IP and multimedia services. In case of HTTP traffic an interactive bearer is requested and set up by the radio access network RAN. For download of general data like web pages an interactive bearer is sufficient. However, HTTP streaming and progressive download using HTTP have other requirements than general HTTP file download. By way of example, a guaranteed bit-rate is necessary, since a continuous media delivery and playout is needed. Compared with RTP streaming, the requirements for HTTP streaming are also different, as HTTP uses TCP (transfer control protocol) with its in-built retransmission mechanisms. The retransmission mechanism retransmits a data packet lost during transmission. Thus, HTTP streaming needs a bearer with higher bit-rate and/or lower error rate compared to RTP streaming, as every lost data packet is retransmitted increasing the data to be transmitted. Thus, a low error rate is advantageously used.

Currently, there are no mechanisms that detect the need of a quality of service (QoS) bearer in case of using HTTP for streaming or progressive download, calculate the parameters of the quality of service bearer and set up the quality of service bearer, e.g. in the IMS domain. Quality of service means that a specific service, such as streaming a media file, will be quantitatively and qualitatively provided as expected by the end-user by using resource reservation control mechanisms in the network and by providing the ability to use different priorities for different applications. In present networks, if the user downloads a media file using HTTP streaming or progressive download using HTTP, it cannot be assured that the bearer has the appropriate bandwidth and error rate needed for a data transfer satisfying the end-user.

SUMMARY

Accordingly, a need exists to provide a possibility to stream a media file to an end-user using HTTP that is satisfying the end-user.

This need is met by the features of the independent claims. Preferred embodiments of the invention are described in the dependent claims.

According to a first aspect of the invention, a method for streaming a media file to an end-user is provided using HTTP. In a first step a network node monitors a HTTP message over a bearer for detecting a streaming of a media file using HTTP. If a HTTP message is detected at the network node, the network node determines bearer parameters required for streaming said media file using HTTP. In an additional step the network node determines whether a bearer meeting an appropriate service quality is necessary for streaming said media file based on the determined bearer parameters. If this is the case, the network node triggers a provision of the bearer meeting said appropriate service quality for the requested media file. According to this aspect of the invention, the network node decides whether a certain service quality is provided or not, and not the user. The network node can be a proxy, a HTTP server where the media file is provided, or the network node may be a deep packet inspection node that is a transparent network node inspecting the data packets as inspection point. In the present invention appropriate service quality means that a bearer is used allowing the user to watch the streamed media file substantially without interruption.

Preferably, the network node analyzes a response message to a HTTP request message requesting the streaming of the media file or the request message itself. Preferably, the network node detects the request message for the media file streaming and analyzes the response message to said request message. Preferably, the connection is a TCP connection that is a connection based on the transmission control protocol TCP. Thus, preferably the HTTP response message is used and analyzed for determining the need of an appropriate service quality.

The provision of the bearer can mean the setup of a new bearer for streaming the media file or a modification of the existing bearer via which the HTTP message is received.

Preferably, said service quality is kept as long as the streaming takes place. As a consequence, the network node releases said bearer with said service quality as soon as it determines that the streaming of the media file is stopped if a new bearer was set up. If the existing bearer was modified for the streaming, the modification can be retracted as soon as it is detected that the streaming has stopped.

According to a preferred embodiment of the invention, the network node calculates bearer parameters for streaming said media file before it triggers the setup of the bearer meeting said appropriate service quality. A first indicator for the need of a service quality may be the "Content Length" HTTP response header. No service quality may be needed for short files, since the setup duration of the bearer having said service quality may even exceed the delivery duration of the file. The bearer parameters can use the content length indication contained in a header of the HTTP message and if the content length indication indicates that a predetermined delivery duration threshold is exceeded, the bearer with said service quality may be provided. In this embodiment the bearer with said appropriate service quality is provided when a predetermined duration threshold is exceeded.

Another possibility for determining whether a bearer with said appropriate service quality is necessary may be to determine the type of media file and to analyze initial sections of the media file. The network node may parse the initial sections of the media file, e.g. mp4 or 3gp as identified by the MIME type in the HTTP response for information, such as the play duration or the needed bandwidth. Thus, another parameter for determining the provision of the bearer with the appropriate service quality is the bandwidth needed for streaming the media file.

When it is determined that the bearer meeting said appropriate service quality is necessary, a bitrate and a packet error rate for streaming said media file to the end user are determined. For the packet error rate a predetermined error rate may be selected, the bandwidth needed for streaming the media file may then be determined as an average or minimal needed bandwidth that allows the streaming of the media file taking into account the retransmitted erroneous packets. A bearer having the determined bit rate and packet error rate is then provided for streaming the media file.

Sometimes it may happen that the network node does not find an explicit bandwidth requirement for streaming said media file. In this situation the network node may measure the bandwidth over an evaluation period and may determine whether the provision of the bearer with the appropriate service quality is necessary based on the measured bandwidths.

If the stream is started through a playlist file (e.g. .m3u), then the HTTP network node may parse the playlist file in the HTTP response to determine the bearer parameters. The network node can then trigger the provision of the bearer based on the determined bearer parameters, when files referenced in the playlist file, are requested by the user. If requests for files are detected that are described in the playlist file, the network node, here an intermediate node, can decide that a streaming session is requested. Bearer parameters can be determined based on the playlist file content and or based on other parameters, such as HTTP response header fields. The playlist file could have been requested earlier during an earlier transaction and stored in the intermediate network node. The playlist file may contain a bandwidth indicator or may contain other parameters such as content duration or content length allowing to determine the bearer parameters. The playlist file can be stored in the network node for later use (e.g. in a cache). The stored playlist file can then be used to calculate the bearer parameters. The playlist file may reference other HTTP resources, which are requested possibly by the receiver and later HTTP requests. If only the playlist file is requested, no extra bearer is established. Thus, the intermediate node monitors, whether files, referenced by the playlist, are requested by subsequent HTTP requests.

Additionally, the HTTP network node may measure the bandwidths to adjust the network service quality. In order to do so, the bandwidth requirement for streaming the media filed may be continuously determined when a bearer meeting the service quality was provided. If the bandwidth requirements change, the network node can initiate the adaption of the bandwidths provided for streaming the media file accordingly.

The network node can trigger the provision of the bearer with said appropriate service quality using the IP multimedia subsystem (IMS), e.g. a policy and charging rules function PCRF of the IP multimedia subsystem. However, the invention is not limited to IMS, it can be used in any network that is able to provide a bearer meeting said appropriate service quality, especially a bearer having the needed bit rate and packet error rate.

When the network node is a HTTP server where the media file is stored, the HTTP server can certainly know for the served content the type of file and the corresponding bandwidth requirements considering the characteristics of TCP traffic. Furthermore, it is possible to use the metadata of the media files for determining whether said appropriate service quality is necessary. The metadata in the media file may contain the information whether or not a bearer having said service quality is needed and may contain the characteristics of the bearer.

The invention furthermore relates to an intermediate network node streaming the media file to the end user using HTTP comprising a monitoring unit monitoring the HTTP messages received over a bearer for detecting a streaming of the media file using HTTP. The network node furthermore comprises a bearer parameter determining unit determining bearer parameters required for streaming the media file using HTTP, the intermediate network node furthermore comprising a bearer provision triggering unit determining whether a bearer having said appropriate service quality is necessary or not as described above. The network node can be a proxy, a deep packet inspection node or the HTTP server itself. In the case of the HTTP server the HTTP server may collect the metadata of the different media files provided on the server already when the media files are stored on the server. Thus, it could be determined in advance whether a bearer having said appropriate service quality is needed or not. If a client or end-user then requests a HTTP streaming session from the server of the operators service layer, the server knows in particular the bandwidth needs for the session.

BRIEF DESCRIPTION OF THE DRAWINGS

The invention will be described in further detail below with reference to the accompanying drawings, in which.

DETAILED DESCRIPTION

Figure 1:
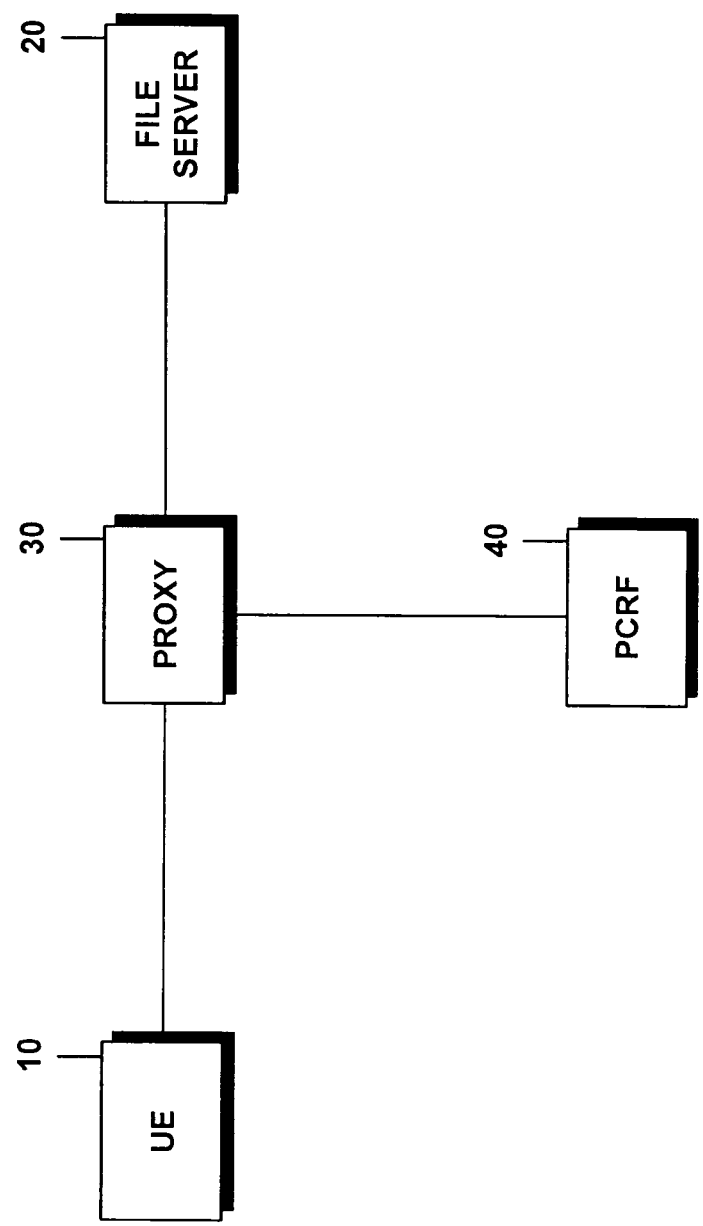
FIG. 1 is a schematic overview of a network node, such as a proxy controlling the setup of a bearer having the appropriate server quality needed for streaming a media file, from a file server to a mobile user entity.

With reference to the Figures, especially FIG. 1, a mobile user entity to requests a media file from a file server 20 using the hypertext transfer protocol HTTP. In the system shown in FIG. 1 a proxy 30 is provided that, in one of the embodiments of the invention, triggers the provision of a bearer having the appropriate service quality needed for streaming said media file. The media file may be a multimedia file having audio and video components, however, the media file can also be a pure audio or video file. The setup of the needed service quality may be obtained by using an IP multimedia subsystem IMS, the IMS core network and the policy encharging rules function (PCRF) 40. However, it should be understood that any other unit controlling the setup of a bearer and controlling the bandwidths and error rate may be used. It should be understood that other mechanisms than IMS could be used to trigger the networks side bearer establishment having the appropriate quality of service. The proxy comprises a receiver (not shown) receiving HTTP messages and a bearer provision triggering unit triggering the provision of a bearer with an appropriate service quality if necessary. The proxy comprises furthermore a monitoring unit monitoring the HTTP request messages and a bearer parameter determining unit determining bearer parameters required for streaming the media file in the needed quality. The different components of the proxy may be incorporated as hardware components or using software. Furthermore, a cache may be provided where metadata of a media file can be stored. The metadata may be used to determine whether a bearer with an appropriate service quality is necessary. The way how the triggering unit calculates bearer parameters and determines whether the bearer with the needed service quality is necessary is discussed in more detail in connection with FIG. 2.

Figure 2:
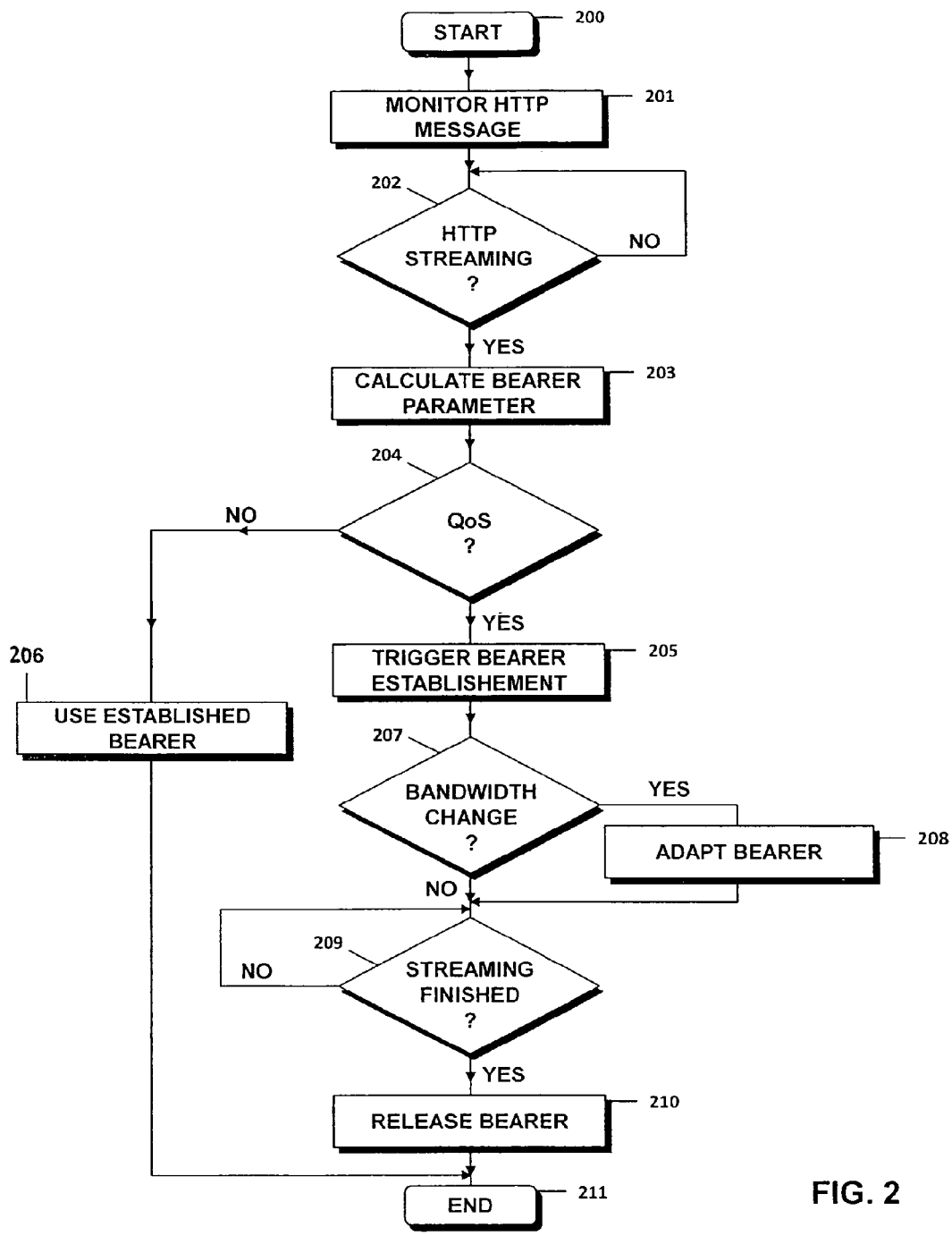
FIG. 2 shows a flow-chart comprising the steps carried out for determining whether a bearer establishment with the appropriate service quality is necessary or not.

In FIG. 2 the main steps are summarized that may be carried out for establishing a bearer providing quality of service meaning an appropriate service quality for streaming the media file. After the start of the process in step 200 the HTTP messages are monitored in step 201. Especially the HTTP requests are monitored in order to detect the streaming of a media file using HTTP. If such a HTTP streaming request is detected in step 202, the bearer parameters needed for streaming the media file are calculated in step 203. In order to do so, the HTTP response messages may be parsed. In step 204 it is asked whether a quality of service for the media streaming is necessary meaning that an appropriate service quality should be provided for the streaming. For the determination whether an appropriate service quality is necessary different possibilities exist. By way of example, the network node, here the proxy, may already determine on the content length HTTP header field, if present, whether or not a quality of service bearer is necessary. If the delivered file response (HTTP session) is sufficiently long, then a bearer having the appropriate service quality may be allocated. Furthermore, the HTTP proxy may already parse initial sections of mp4 or 3gp files, since those contain a media description including the media bitrate, duration, etc. Additionally, the HTTP proxy may further parse in particular playlist files, such as .m3u files, as those files may indicate the duration and/or bitrate of referenced files.

If the HTTP proxy does not find explicit bandwidth descriptions then the proxy may measure the bandwidth over a short evaluation period. This may be done only for longer sessions determined by the content length contained in the header. If the requirements for the appropriate service quality have been determined in steps 203 and 204, the establishment of the bearer with said appropriate service quality as calculated is triggered in step 205. This can meant that a new bearer is set up meeting the needed service quality or the existing bearer can be modified. In both cases a bearer is provided having the needed bit rate and packet error rate allowing a streaming of the media file in such a way that it is played out at the end user without interruption. If the result of the calculation of the bearer parameters in step 203 and the analysis of step 204 is that an appropriate service quality is not necessary, then the already established bearer is used for transmission of the media file (step 206). If the bearer was established in step 205, the streaming of the file may be supervised in step 207 by asking whether the bandwidth of the streamed media file changes. By way of example, in case of a playlist with several media files, the bandwidth requirements for the different media files may vary. In case of a varying bandwidth, the bearer is adapted accordingly in step 208. If not, the bandwidth is kept constant. Additionally, it is asked in step 209 whether the streaming is finished. As soon as the streaming of the media file is stopped, the corresponding network node initiates the release of the bearer in step 210 before the method ends in step 211.

Figure 3:
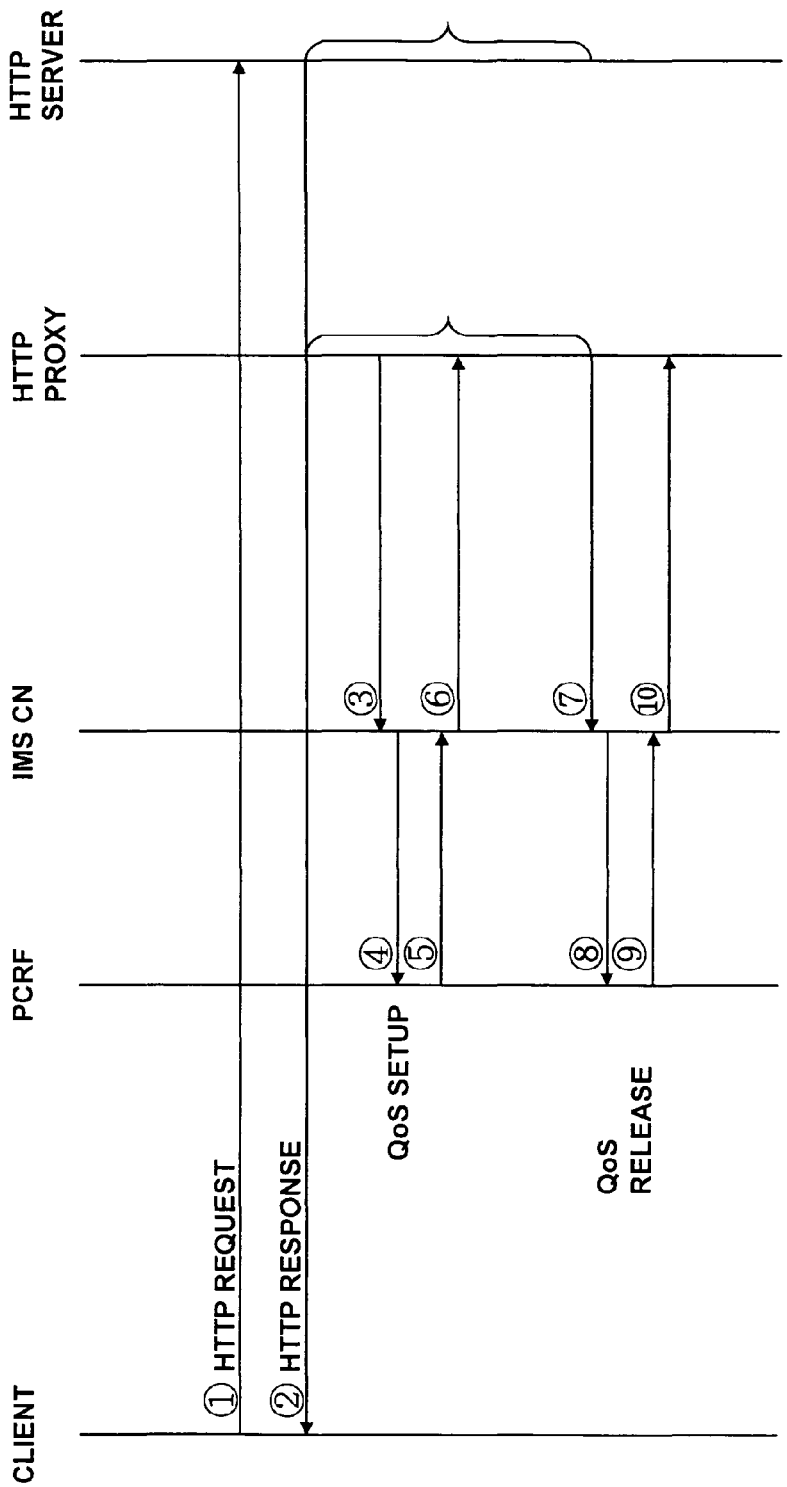
FIG. 3 shows a flow-chart in which an intermediate node is used to initiate the bearer setup.

The network controlled provision of a bearer having the appropriate service quality may be initiated by an HTTP proxy realisation as shown in further detail in FIG. 3 or by an HTTP server itself as will be discussed later on in connection with FIG. 4. In connection with FIG. 3 an end-user or client sends in a first step a HTTP request message to the HTTP server, these messages being monitored by the HTTP proxy. The HTTP server sends a response message back to the client in step 2, the HTTP proxy parsing the response message. The HTTP proxy detects and decides whether the data transfer can be executed via the already established interactive bearer or whether the bearer having the appropriate service quality is needed for the used TCP connection. The HTTP proxy determines the bearer parameters as described in detail with reference to FIG. 2 and can then decide whether a quality of service bearer, i.e. a bearer having the appropriate service quality, is set up or not. If the quality of the service bearer should be set up, the HTTP proxy initiates the setup by sending a corresponding message via the IMS core network to the PCRF in steps 3 and 4, the PCRF acknowledging and informing the HTTP proxy of the setup bearer, the two brackets at the HTTP proxy and the HTTP server indicating that the HTTP streaming session is going on. When the proxy detects that the HTTP session is stopped, the HTTP proxy triggers the closing of the HTTP session with said bearer, the HTTP proxy informing the PCRF, the PCRF acknowledging the request (steps 7 to 10).

Figure 4:
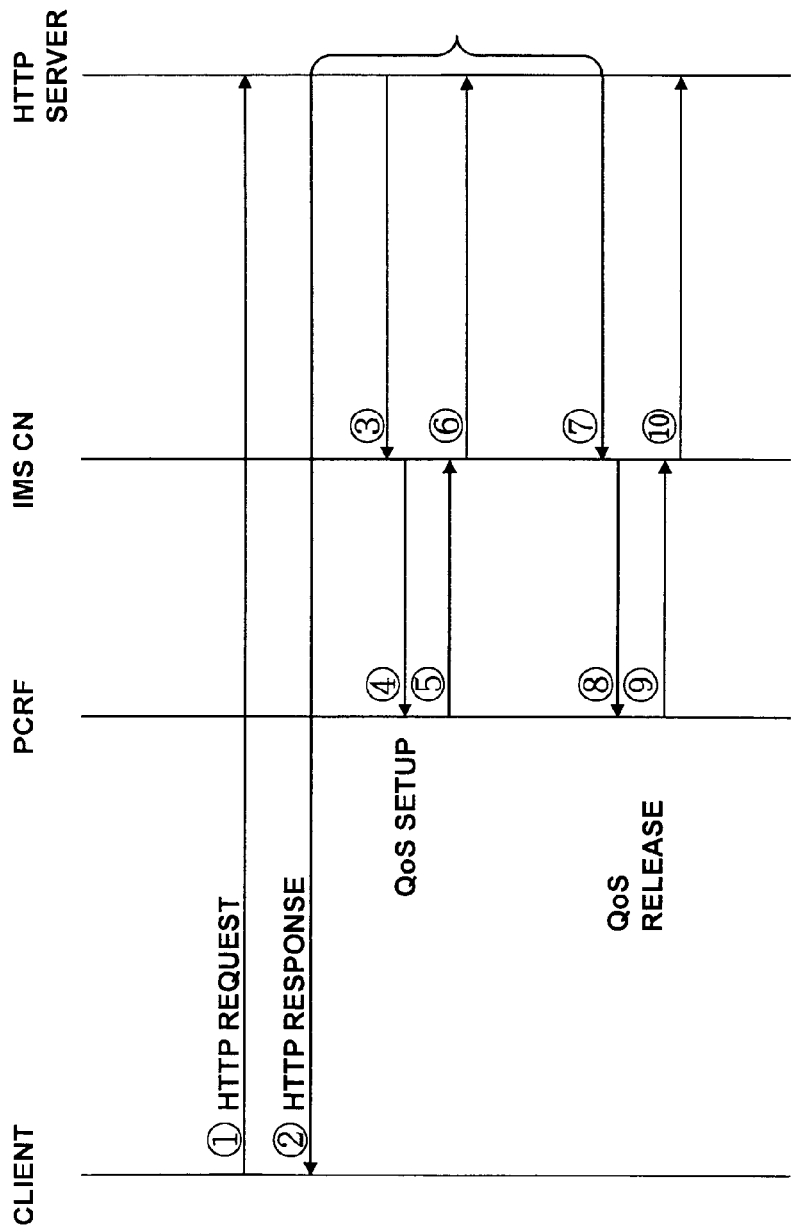
FIG. 4 shows a flow-chart where the HTTP server itself initiates the bearer setup.

In FIG. 4 an embodiment is shown where the network node triggering the bearer setup is the HTTP server itself. The client sends the HTTP request to the server, the server sending the response message back to the client (steps 1 and 2). The HTTP server determines the need for a bearer with said appropriate service quality. To this end, the HTTP server may look into the metadata of the media file to be streamed and determine based on the information given in the metadata whether the bearer meeting said appropriate service quality is needed or not. If there is a need and a justification, then the HTTP server triggers quality of service session establishment through e.g. IMS with the network (steps 3 to 6). As soon as the file is completely served, the server may release the quality of service resources (steps 7 to 10), the streaming going on between steps 2 and 7. The HTTP server may keep a bitrate information for each HTTP resource in a separate file or may determine them on the fly when needed.

Additionally, catching HTTP proxies exist, which store the streamed media file. In case of the first streaming the catching HTTP proxy corresponds to the embodiment disclosed in FIG. 3, whereas in case of a second streaming the embodiment corresponds to the HTTP server case described in FIG. 4, as the media file to be streamed is provided on the network node that triggers the setup of the bearer.

The invention claimed is:

1. A method for streaming a media file to an end-user using a hypertext transfer protocol (HTTP), the method comprising:

monitoring, at a network node, a HTTP message received over a bearer for detecting a streaming of the media file using HTTP;

determining, by the network node, bearer parameters required for streaming said media file using HTTP;

determining, by the network node, whether a bearer meeting an appropriate service quality is necessary for streaming said media file based on the determined bearer parameters; and when the bearer meeting the appropriate service quality is necessary for streaming said media file based on the determined bearer parameters, triggering, by the network node, a provision of the bearer meeting said appropriate service quality for the requested media file, wherein the network node calculates bearer parameters for streaming said media file before it triggers the provision of the bearer meeting said appropriate service quality;

wherein the bearer parameters are calculated using a content length indication contained in a header of said HTTP message, and wherein the provision of said bearer with said appropriate service quality is triggered when the content length indication indicates that a predetermined delivery duration threshold is exceeded.

2. The method according to claim 1, wherein monitoring the HTTP message comprises analyzing, by the network node, a HTTP request message or a response message to said HTTP request message.

3. The method according to claim 1, wherein the provision of the bearer comprises a setup of a new bearer or a modification of the bearer over which the HTTP message is received.

4. The method according to claim 3, wherein the network node releases said bearer with said appropriate service quality or retracts the modification of the bearer as soon as it determines that the streaming of the media file is stopped.

5. The method according to claim 1, wherein the network node calculates the bearer parameters by determining the type of media file and by analyzing initial sections of the media file for determining whether said bearer having said appropriate service quality is necessary.

6. The method according to claim 1, wherein, if the network node detects a request for streaming a media file that is described in a playlist file, the network node analyses the playlist file in order to determine the bearer parameters for determining whether the bearer meeting said appropriate service quality is necessary, the network node triggering the provision of the bearer having said appropriate service quality based on the determined bearer parameters.

7. The method according to claim 1, wherein, when the network node does not find an explicit bandwidth requirement for streaming said media file, the network node measures the bandwidth over an evaluation period and determines whether the provision of the bearer having said appropriate service quality is necessary based on the measured bandwidth.

8. The method according to claim 1, wherein, when it is determined that the bearer meeting said appropriate service quality is necessary, a bit rate and a packet error rate for streaming said media file to the end-user are determined.

9. The method according to claim 1, wherein the network node triggers the provision of the bearer with said appropriate service quality using a policy and charging rules function PCRF of an IP multimedia subsystem.

10. The method according to claim 1, further comprising continuously determining a bandwidth requirement for streaming the media file for which the bearer meeting said appropriate service quality was provided during streaming, wherein when it is determined that the bandwidth requirement changes, the network node initiates the adaption of the bandwidth provided for streaming said media file in accordance with the changing bandwidth requirement.

11. The method according to claim 1, wherein the bearer parameters are derived from metadata of said media file.

12. An intermediate network node streaming a media file to an end user using a hypertext transfer protocol (HTTP), comprising one or more processing circuits configured as:
    a monitoring unit configured to monitor a HTTP message received over a bearer for detecting a streaming of the media file using HTTP;
    a bearer parameter determining unit configured to calculate bearer parameters required for streaming said media file using HTTP, wherein the bearer parameters are calculated using a content length indication contained in a header of said HTTP message, wherein the provision of said bearer with said appropriate service quality is triggered when the content length indication indicates that a predetermined delivery duration threshold is exceeded; and
    a bearer provision triggering unit configured to determine whether a bearer having an appropriate service quality is necessary for streaming said media file, wherein the bearer provision triggering unit triggers a provision of the bearer with said appropriate service quality based on the calculated bearer parameters, when it has determined that said bearer with said appropriate service quality is necessary for streaming said media file.

13. The intermediate network node according to claim 12, wherein the network node is a proxy or a deep packet inspection node.

14. The intermediate network node according to claim 12, wherein the one or more processing circuits are further configured as a cache unit configured to store metadata of said media file, the bearer parameter determining unit being configured to use the metadata stored in the cache to determine the bearer parameters.

\* \* \* \* \*